United States Patent
Smith et al.

(10) Patent No.: US 6,224,304 B1
(45) Date of Patent: May 1, 2001

(54) BIT ATTACHING ARRANGEMENT FOR POWER TOOL

(75) Inventors: Allen P. Smith, Baltimore; Dale K. Wheeler, Fallston, both of MD (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 09/265,275

(22) Filed: Mar. 9, 1999

(51) Int. Cl.[7] .................................. B23C 1/20; B23B 45/14
(52) U.S. Cl. ........................... 409/182; 279/62; 279/150; 408/240
(58) Field of Search ...................... 279/147, 148, 279/150, 149, 48, 49; 409/182, 181; 408/241 R, 240

(56) References Cited

U.S. PATENT DOCUMENTS

| | | | |
|---|---|---|---|
| 1,489,976 | * 4/1924 | Brown | 279/147 |
| 1,816,239 | 7/1931 | Hamersveld et al. . | |
| 1,874,888 | * 8/1932 | Burrell | 279/150 |
| 2,211,216 | * 8/1940 | Oster | 279/147 X |
| 2,387,981 | * 10/1945 | Davis | 279/148 X |
| 2,483,662 | * 10/1949 | Niederhiser | 279/147 X |
| 2,807,732 | 9/1957 | Kurtovich . | |
| 2,897,302 | 7/1959 | Godfrey et al. . | |
| 3,008,723 | 11/1961 | Caldwell . | |
| 3,443,479 | 5/1969 | Hawley et al. . | |
| 3,447,001 | 5/1969 | Zelik . | |
| 3,487,747 | 1/1970 | Burrows et al. . | |
| 3,587,387 | 6/1971 | Burrows et al. . | |
| 3,728,038 | * 4/1973 | Gage | 408/241 R |
| 3,767,948 | 10/1973 | Batson . | |
| 3,811,361 | 5/1974 | Seely et al. . | |
| 3,882,758 | * 5/1975 | Muller | 408/239 |
| 4,324,512 | 4/1982 | Siroky | 408/240 |
| 4,386,879 | 6/1983 | Martinmaas . | |
| 4,389,146 | 6/1983 | Coder . | |
| 4,400,995 | 8/1983 | Palm . | |
| 4,461,330 | 7/1984 | Judkins . | |
| 4,526,497 | 7/1985 | Hatfield . | |
| 4,536,113 | 8/1985 | Hatfield . | |
| 4,652,187 | 3/1987 | Regelsberger et al. . | |
| 4,682,918 | 7/1987 | Palm . | |
| 4,718,797 | 1/1988 | Purviance . | |
| 4,804,048 | 2/1989 | Porth, Jr. . | |
| 4,915,555 | 4/1990 | Smothers . | |
| 5,030,044 | 7/1991 | Eros . | |

(List continued on next page.)

FOREIGN PATENT DOCUMENTS

2157204 * 10/1985 (GB) ................................. 279/148

OTHER PUBLICATIONS

Patent Abstract, No. SU 1484980, dated Jun. 1989.

*Primary Examiner*—William Briggs
(74) *Attorney, Agent, or Firm*—Shook, Hardy & Bacon L.L.P.

(57) ABSTRACT

A bit attaching arrangement for a power tool has a collet nut threadably engaging a rotatably driven shaft of the power tool. The collet nut has a plurality of slots positioned on an outer peripheral surface. A first gear is disposed on the shaft so that rotation of the first gear causes rotation of the shaft. An actuating member having a second gear associated therewith is attached to the housing of the power tool. The actuating member also has a slot-engaging extension associated therewith. The actuating member is positionable between a first position and a second position. In the first position, the second gear engages the first gear and the extension engages one of the slots of the collet nut such that rotation of the actuating member results in rotation of the shaft while maintaining the collet nut at a generally fixed rotational location. In a second position, the first and second gears do not engage one another and the extension does not engage any of the slots of the collet nut such that the shaft can be freely rotated during operation of the power tool.

27 Claims, 2 Drawing Sheets

U.S. PATENT DOCUMENTS

| | | |
|---|---|---|
| 5,191,968 | 3/1993 | McCurry . |
| 5,342,154 | 8/1994 | Holzer . |
| 5,496,139 | 3/1996 | Ghode et al. . |
| 5,531,549 | 7/1996 | Fossella . |
| 5,620,188 | 4/1997 | McCurry et al. . |
| 6,042,310 * | 3/2000 | Campbell et al. .................... 409/131 |

* cited by examiner

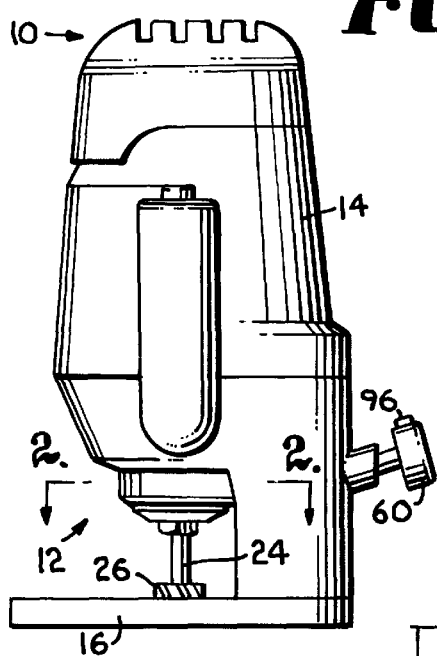
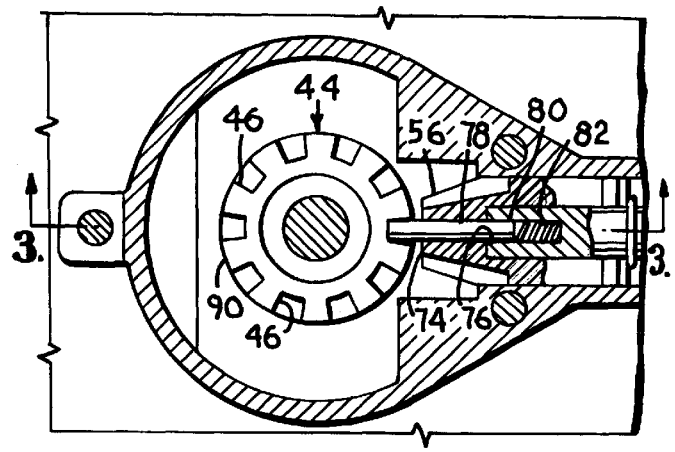
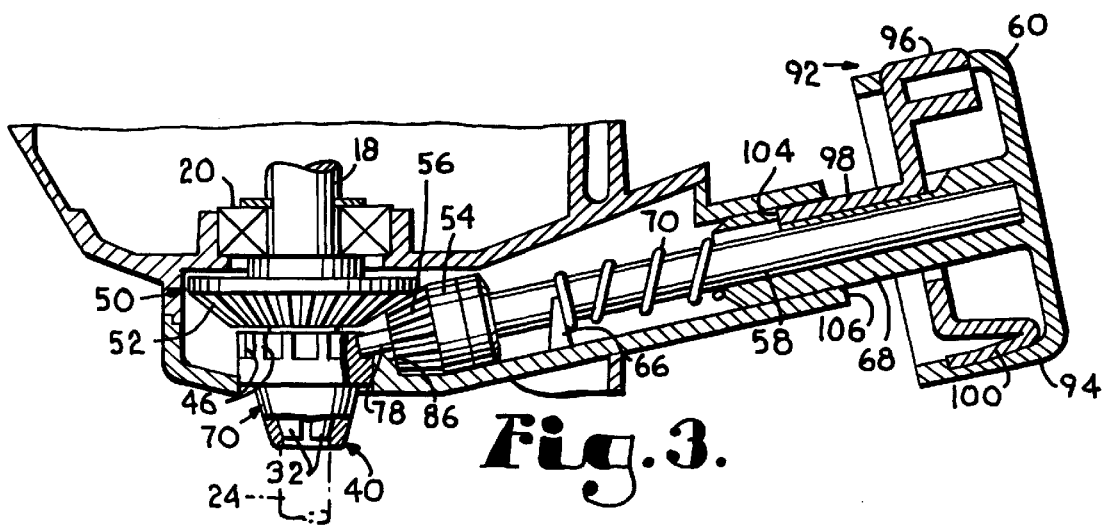

BIT ATTACHING ARRANGEMENT FOR POWER TOOL

FIELD OF INVENTION

This invention relates to a bit attaching arrangement for a power tool, and more particularly to an arrangement that allows the bit to be attached without the use of external wrenches or keys.

BACKGROUND OF THE INVENTION

Power tools, such as routers, often incorporate a collet for holding the shank end of a bit in place on the lower end of the rotating armature/output shaft. In particular, the collet consists of a generally cone-shaped structure having a split end which defines separate prongs which are usually biased slightly radially outwardly. The end of the collet opposite the prongs is generally attached to or formed integrally with the output shaft of the router. A router locking nut is used to secure a bit onto the output shaft. The collet nut has a female thread surface which engages the male thread surface located on the lower end of the output shaft. The collet nut fits over the collet and has a female cone-shaped camming surface for engaging the cone-shaped outer surface of the collet.

In order to attach a bit to a router utilizing this well-known structure, the shank of the bit is positioned between the prongs of the collet with the collet nut in a loosened position on the output shaft. After the shank of the bit is completely disposed within the hollow output shaft, the collet nut is tightened such that the prongs of the collet engage the side surfaces of the shank and firmly hold the bit in place on the lower end of the shaft. In order to sufficiently tighten the collet nut so as to secure the bit, external and separate tools and/or wrenches are typically utilized. In particular, the tightening operation of this prior art structure often involves utilizing a shaft lock arrangement which prevents rotation of the output shaft of the router and thereafter allows manual tightening of the nut using a dedicated individual wrench which is often included with the router when it is sold.

This prior locking arrangement suffers from numerous disadvantages. First, because the tightening wrench is a separate item, it is often lost or misplaced after the router has been used for a period of time. This often results in an operator utilizing a nondedicated wrench or pliers to tighten the collet nut. Use of an incorrect sized wrench or pliers may result in damage to the collet nut and/or locking arrangement. Additionally, use of a nondedicated wrench can also result in the collet nut not being sufficiently tightened causing slippage between the bit and the output shaft.

A further disadvantage is the amount of time it takes to replace a router bit. More specifically, to adequately tighten the collet nut, it requires numerous placement and replacement of the wrench on the collet nut to tighten the nut. This is due to limited access to the attaching arrangement through the guards and support plates of the router. Still further, as mentioned above, to rotate the nut with respect to the output shaft, oftentimes there is a shaft-locking mechanism disposed internally within the assembly. This can result in a further disadvantage because of the possibility of the shaft-locking mechanism malfunctioning and impeding the rotation of the output shaft.

Therefore, a bit-locking arrangement is needed which will overcome the problems discussed above.

SUMMARY OF THE INVENTION

Accordingly, it is an object of the present invention to provide a locking arrangement for a power tool which does not require any external wrenches or tools to secure the bit to the output shaft of the power tool.

Another object of the present invention is to provide a locking arrangement which does not require a separate spindle lock for maintaining the outward shaft stationary as the tightening nut of the arrangement is turned.

A still further object of this invention is to provide a bit-locking arrangement which is self-contained within the power tool and which provides for general fixation of the locking member while rotating the output shaft of the power tool to accomplish the tightening and loosening process.

Accordingly, the present invention provides for a bit-attaching arrangement for a power tool wherein the power tool has a rotatably driven shaft onto which a bit is attached and rotated through the use of a collet. The arrangement includes a collet nut threadably engaging the shaft. The collet nut has a plurality of slots positioned on an outer peripheral wall. A first gear is disposed on the shaft so that rotation of the first gear causes rotation of the shaft. An actuating member has a second gear and a slot engaging extension. The actuating member is positionable between a first position and a second position. In the first position, the second gear engages the first gear and the extension engages one of the slots. Upon rotation of the actuating member, the shaft will rotate and the collet will be maintained at a generally fixed rotational location, thus allowing loosening and tightening of a bit. In the second position, the first and second gears do not engage one another, and the extension does not engage one of the slots so that the shaft can be freely rotated during the powered operation of the tool.

The invention further includes the actuating member having a knob for rotation of the second gear. The actuating member is disposed in an aperture formed in the housing of the power tool. A button is disposed on the peripheral surface of the knob and is connected to a flange member that abuts a portion of the housing adjacent the aperture when the actuating member is in its second position. In order to orient the actuating member to its first position, the button is depressed to allow the flange to pass within the aperture, and thus to move the actuating member to its first position.

Additional objects, advantages, and novel features of the invention will be set forth in part in the description that follows, and in part will become apparent to those skilled in the art upon examination of the following, or may be learned by practice of the invention.

BRIEF DESCRIPTION OF THE DRAWINGS

In the accompanying drawings, which form part of this specification and are to be read in conjunction therewith, and in which like reference numerals are used to indicate like parts in the various views:

FIG. 1 is a side elevational view of a router, with a bit-locking arrangement embodying the principles of this invention;

FIG. 2 is a cross-sectional view taken generally along line 2—2 of FIG. 1 and showing the pinion shaft in its engaged position to allow rotation of the output shaft and maintain the collet nut at a generally fixed rotational location;

FIG. 3 is a cross-sectional view taken generally along line 3—3 of FIG.2;

DETAILED DESCRIPTION OF THE PREFERRED EMBODIMENTS

Figure 4:
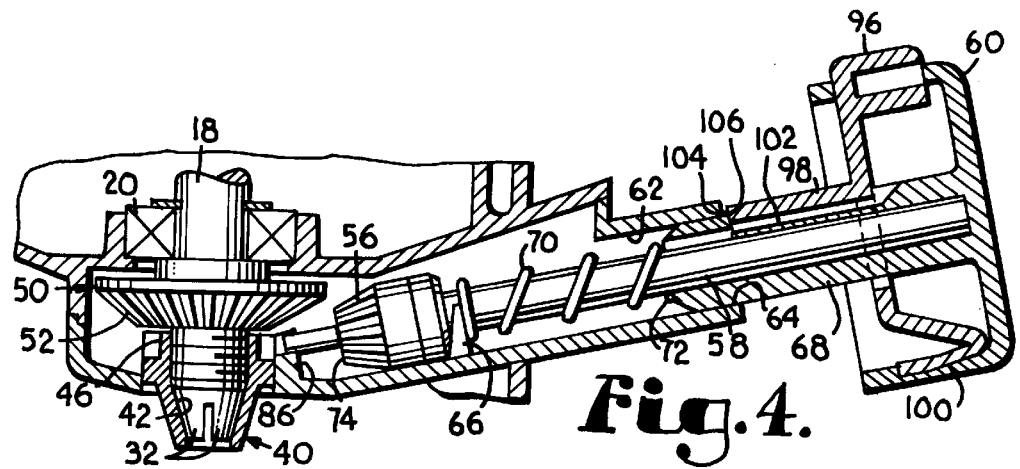
FIG. 4 is a view similar to FIG. 3, but showing the pinion shaft in its retracted disengaged position and locked in place via the lockout structure of the knob.
Figure 5:
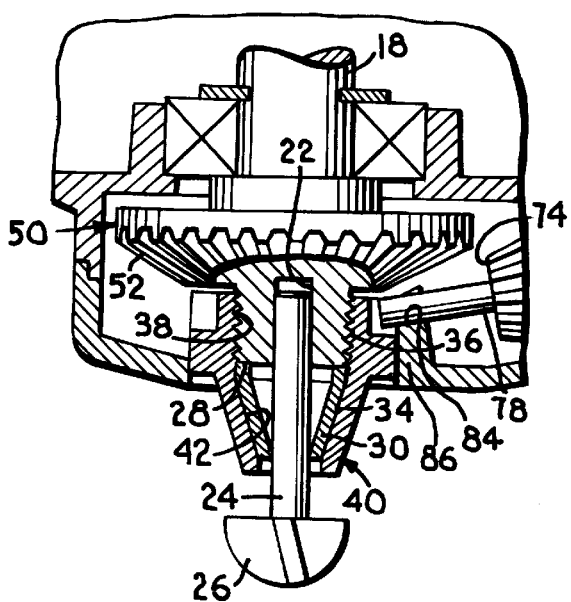
FIG. 5 is a view similar to FIG. 4 showing a bit secured in the bit-locking arrangement, and the pinion shaft in its disengaged position to allow operation of the router.

Referring to the drawings in greater detail, and initially to FIG. 1, a router 10 having a bit-locking arrangement 12 according to the present invention is shown. Router 10 includes a housing 14 mounted to a generally horizontal support plate 16. Contained within housing 14 is a motor (not shown) which rotates a generally cylindrical armature or output shaft 18, as shown in FIG. 3. Shaft 18 is supported in housing 14 by a bearing assembly 20. Shaft 18 has a cylindrical bit receiving bore 22 formed on an exposed end, as shown in FIG. 5. Bore 22 is configured to receive a shank portion 24 of a bit 26. Shaft 18 further has a generally annular receiving area 28 formed on its lower end for maintaining a conical collet 30 thereon. Collet 30 includes connected generally semicircular prongs 32 (as best shown in FIG. 4), each having an inclined outer surface 34. Prongs 32 of collet 30 surround shank 24 of bit 26, as best shown in FIG. 5, such that the interior surface of prongs 32 engage shank 24 to secure bit 26 in position, as will be more fully described below. Although collet 30 is shown as a separate piece from shaft 18, it may be desirable, and it is within the scope of this invention to form collet 30 integral with the bottom of output shaft 18.

Shaft 18 further has outer thread surface 36 located adjacent its lower end, as best shown in FIG. 5. Thread surface 36 engages female thread surface 38 of a collet nut 40, such that collet nut 40 can be tightened and loosened on the lower end of shaft 18 to secure bit 26 in place, as will be more fully described below. Nut 40 further has a generally conical inner camming surface 42 for engaging the inclined surfaces 34 of prongs 32, such that upward movement of nut 40 on shaft 18 results in prongs 32 being forced inwardly to tightly engage shank 24 and secure bit 26 in position, as best shown in FIG. 5.

With reference to FIGS. 2 and 3, nut 40 further includes an outer peripheral surface 44 on which are formed a plurality of evenly spaced slots or splines 46. Slots 46 are utilized to hold nut 40 at a generally fixed rotational location during tightening and loosening of bit 26, as will be more fully described below. Each slot 46 is closed along its bottom and open at the top. Slots 46 are generally rectangular in shape and the sidewalls of the slots provide abutment surfaces that prevent rotation of nut 40 during tightening and loosening, as will be more fully described below.

Arrangement 12 further has an upper gear 50. Upper gear 50 is secured on an outer surface of shaft 18, such that rotation of gear 50 will result in rotation of shaft 18. In particular, gear 50 can be key to shaft 18 in any suitable manner. Gear 50 includes an annular beveled gear surface 52 which will be utilized to rotate shaft 18, as will be more fully described below. A pinion gear 54 has an annular beveled gear surface 56 for engaging gear surface 52. Rotation of gear 54 results in rotation of gear 50 and thus results in rotation of shaft 18. Thus, depending on which direction pinion gear 54 is rotated, such rotation can result in tightening or loosening of bit 26 in collet nut 40.

Pinion gear 54 can be rotated by a router operator via pinion shaft 58 and actuating knob 60. In particular, shaft 58 is slidably and rotatably mounted to housing 14 via a generally cylindrical passage 62, as best shown in FIG. 4. Passage 62 has an aperture 64 on one end through which pinion shaft 58 extends. Pinion shaft 58 is supported in passage 62 by an upwardly extending support member 66. Additionally, knob 60 has formed therewith a generally annular cylindrical portion 68 which fits around pinion shaft 58 and snugly fits within aperture 64.

A coilspring 70 generally surrounds pinion shaft 58 and is positioned between an abutting surface 72 of cylindrical portion 68 of knob 60 and support 66. Spring 70 serves to bias pinion shaft 58 outwardly away from collet nut 40 and toward a position wherein pinion gear 58 is disengaged from upper gear 50.

With reference to FIG. 2, located on an end surface 74 of pinion shaft 58 is a generally cylindrical receiving bore 76. Received in bore 76 is a cylindrical locking pin or extension 78. Pin 78 is used to engage one of slots 46 to hold collet nut 40 at a generally fixed rotational location during tightening and loosening, as will be more fully explained below. One end of pin 78 has a collar 80 formed therewith which prevents pin 78 from becoming disengaged from bore 76. In particular, pin 78 can slide telescopically in and out of bore 76 and is biased outwardly away from end surface 74 by a coilspring 82.

Pin 78 is also received in an aperture 84 formed in a pin bearing member 86, as best shown in FIG. 5. Bearing member 86 ensures that pin 78 will be adequately aligned with the appropriate slot 46.

Pin 78 can engage any one of slots 46 when pinion gear 54 engages upper gear 50. As pin 78 engages one of slots 46, rotation of collet nut 40 will be prevented. Thus, rotation of pinion shaft 58 will result in collet nut 40 being fixed and shaft 18 being rotated. This rotational motion of pinion shaft 58 will result in tightening and loosening of collet nut 40 because collet nut 40 will move slightly up and down along thread surface 36 to accomplish the pinching and loosening actions of prongs 32.

The provision of bore 76 with pin 78 disposed therein and the biasing of spring 82 allows pin 78 to translate only approximately one half the distance that pinion shaft 58 translates to thereby reduce the necessary size of gear 50. For instance, if pinion shaft 58 were to translate 8 mm, it would be necessary for pilot pin 78 to translate 4 mm. This arrangement of pin 78 slidably coupled to shaft 58 also ensures that pin 78 is always maintained in bearing member 86 during the translation inwardly and outwardly of shaft 58, as shown in FIGS. 3 and 4. Thus, pin 78 is always within aperture 84 of bearing member 86 and does not have to be realigned with the aperture every time pinion shaft 58 is translated. Still further, the spring loading action of pin 78 allows surface 52 to be at least partially engaged by gear surface 56 prior to pin 78 being disposed in one of slots 46. More specifically, there may be occasions where an operator wishes to loosen a bit and thus translates pinion shaft 58 inwardly. Depending upon the rotational location of collet nut 40, pin 78 may not be aligned with one of slots 46, but instead may be aligned with a peripheral surface segment 90 of collet nut 40 which prevents pin 78 from locking collet nut 40 at a rotational location. If this situation occurs, pin 78 will be compressed in bore 76 against the bias of spring 82 to such an extent to allow gear surface 52 to engage gear surface 56. An operator can then rotate shaft 58 utilizing knob 60, thus resulting in rotation of collet nut 40, until such time as pin 78 "snaps" into an appropriate slot 46, thus fixing the collet nut at a rotational location.

With reference to FIGS. 3 and 4, a lockout structure 92 is shown. Lockout structure 92 is formed into knob 60, as will be further described below. More specifically, the outer circumferential surface 94 of knob 60 has a lockout actuating button 96 which can be easily operated by a user gripping knob 60. Button 96 is integrally connected to a locking flange, and further has a leaf-type biasing member 100 located opposite button 96 which serves to bias button 96 and thus locking flange 98 circumferentially outwardly away from pinion shaft 58. Still further, portions 60 of knob 60 has a recess 102 formed therein for accommodating locking flange 98 when it is in its disengaged position to allow inward movement of shaft 58, as best shown in FIG. 3.

Locking flange 98 is shown in its lockout position in FIG. 4, wherein a front edge 104 of locking flange 98 engages an edge surface 106 of housing 14 adjacent aperture 64. This engagement prevents shaft 58 from being translated inwardly accidentally until such time as the operator desires to translate shaft 58 inwardly by depressing button 96, and thus disengaging locking flange 98 from edge surface 106. After such actuation of button 96, flange 98 is received in recess 102 and shaft 58 can be pushed inwardly such that flange 98 also slides within aperture 64. As best shown in FIGS. 3 and 4, it is preferable to have pinion shaft 58 at an angle to the horizontal surface of plate 16. This horizontal angle ensures that knob 60 is an adequate distance above plate 16 so as to not interfere with workpieces, guard surfaces, or adjusting structures.

In operation, arrangement 12 is first found in its untightened open position shown in FIG. 4. More specifically, in this position prongs 32 of collet 30 are not yet being forced inwardly by the engagement between inclined surfaces 34 and camming surface 42 of nut 40. Thus, shank 24 of bit 26 can be inserted through collet 30 and received in bore 22 of shaft 18. In order to secure bit 26 in place on shaft 18, an operator first pushes inwardly on button 96 so as to disengage locking flange 98 from edge surface 106. Thereafter, an operator pushes inwardly on knob 60 such that pin 78 engages one of slots 46 on collet nut 40 and such that pinion gear 58 engages upper gear 50. As is apparent, this inward movement of shaft 58 is against the bias of coilspring 70. Shaft 58 slides within passage 62 easily due to the support member 60, and also the tight fit of portion 68 of knob 60. After the gears are engaged, pin 78 maintains collet nut 40 at a fixed rotational location, and knob 60 can be rotated such that gear 50, and thus shaft 18, are rotated with respect to collet nut 40. This rotation of shaft 18 with respect to collet nut 40 results in the tightening of bit 26 in bore 22.

After collet nut 40 has been adequately tightened, the operator releases all inward pressure on knob 60, and thus pinion gear 54 returns to its nonengaged position due to coilspring 70 expanding from its compressed condition. Further, as shaft 58 moves further outwardly, edge 104 of flange 98 will clear edge 106 of housing 14 such that flange 98 snaps upwardly due to biasing member 100 to automatically lock shaft 58 in its outward nonengaging position. It is apparent that loosening of a bit takes place in the same manner described above except that pinion gear 54 is rotated in an opposite direction to loosen collet nut 40.

Arrangement 12 offers numerous advantages over prior securing structures. In particular, arrangement 12 is completely self-contained within housing 14, so that no separate wrenches or tools are required to secure bit 26 to output shaft 18. Further, pin 78 allows an effective locking mechanism for collet 30 formed with pinion gear 54. As is apparent, it is necessary that collet nut 40 move slightly vertically along shaft 18, which is accomplished by the open-ended structure of slots 46. Thus, pinion gear 54 with pin 78 thereon offers a highly advantageous single structure for accomplishing both the fixation of collet nut 40 and the rotation of shaft 18.

Still further, the spring loaded nature of pin 78 ensures locking of collet nut 40 even if not properly oriented at the beginning of a tightening or loosening action, and further ensures that the pin is adequately supported even as pinion shaft 58 is translated from its engaged to its disengaged position.

Figure 6:
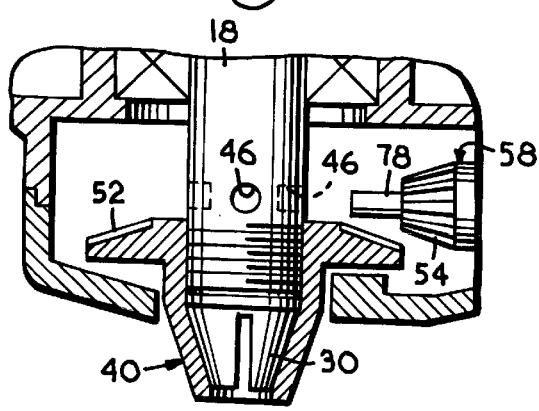
FIG. 6 is a view showing an alternative bit-locking arrangement.

As is shown in FIG. 6, it may be possible to modify the bit attaching arrangement by providing the collet nut 40 with a bevel gear 50 instead of the nut having slots 46 and by providing shaft 18 with slots 46 instead of gear 50. In such an embodiment, shaft 58 with pin 78 and pinion gear 54 will operate in the same manner as described above, except that pin 78 will engage slots 46 on the shaft 18 instead of slots on collet nut and pinion gear 54 will engage gear 54 on collet nut 40 instead of a gear surface on shaft 18. Thus, in this embodiment shaft 18 is held fixed and collet nut 46 is rotated to tighten and loosen a bit.

From the foregoing, it will be seen that this invention is one well-adapted to obtain all the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A bit attaching arrangement for a power tool, the power tool having a rotatably driven shaft onto which a bit is attached and rotated therewith through the use of a collet, the arrangement comprising:

a collet nut threadably engaging the shaft, said collet nut having one of a plurality of slots positioned on an outer peripheral wall;

a first gear disposed on the shaft so that rotation of said first gear causes rotation of the shaft; and an actuating member having a second gear associated therewith and also having a slot engaging extension associated therewith;

wherein said actuating member is positionable between a first position and a second position; in said first position said second gear engages said first gear and said extension engages one of said slots such that rotating of said actuating member results in rotation of the shaft while maintaining said collet at a generally fixed rotational location; in said second position, said first and second gears do not engage one another and said extension does not engage any of said slots such that the shaft can be freely rotated during operation of the power tool.

2. The arrangement of claim 1 wherein said first and second gears are bevel gears.

3. The arrangement of claim 1 wherein said second gear is a pinion and said actuating member is a pinion shaft rotatably mounted to the power tool and rotatably actuatable by a power tool operator.

4. The arrangement of claim 3 wherein said pinion shaft is slidably mounted to the power tool so that sliding movement of said pinion shaft results in said second gear being positionable between its first and second positions.

5. The arrangement of claim 1 wherein said actuating member is biased toward its second position.

6. The arrangement of claim 1 wherein said extension is a cylinder.

7. The arrangement of claim 1 wherein said extension is slidably received in said actuating member.

8. The arrangement of claim 7 wherein said extension is biased toward said collet nut.

9. The arrangement of claim 1 further including a lockout structure for locking said actuating member in said second position.

10. The arrangement of claim 9 wherein said actuating member includes a knob for rotation of said second gear and wherein said actuating member is disposed in an aperture formed in a housing of the power tool, and wherein said lockout structure includes a button disposed on a peripheral surface of said knob, said button connected to a flange member that abuts a portion of said housing adjacent said aperture when said actuating member is in its locked position and passes through said aperture when said button is depressed to allow movement of said actuating member to said first position.

11. The arrangement of claim 10 wherein said flange member is received in a recess formed in said actuating member when said button is depressed.

12. The arrangement of claim 10 wherein said button is biased toward its locked position.

13. A router having a rotatably driven shaft onto which a bit is attached and rotated therewith through the use of a collet, the arrangement comprising:

a collet nut threadably engaging the shaft and movable along the shaft by rotation between the shaft and collet nut, said collet nut having an abutment surface positioned on an outer peripheral wall;

a first gear disposed on the shaft so that rotation of said first gear causes rotation of the shaft; and an actuating member having a second gear associated therewith and also having an abutment engaging extension associated therewith;

wherein said actuating member is positionable between a first position and a second position; in said first position, said second gear engages said first gear and said extension engages said abutment such that rotating of said actuating member results in rotation of the shaft while maintaining said collet at a generally fixed rotational location; in said second position, said first and second gears do not engage one another and said extension does not engage said abutment such that the shaft can be freely rotated during operation of the power tool.

14. The arrangement of claim 13 wherein said first and second gears are bevel gears.

15. The arrangement of claim 13 wherein said second gear is a pinion and said actuating member is a pinion shaft rotatably mounted to the power tool and rotatably actuatable by a power tool operator.

16. The arrangement of claim 13 wherein said pinion shaft is slidably mounted to the power tool so that sliding movement of said pinion shaft results in said second gear being positionable between its first and second positions.

17. The arrangement of claim 13 wherein said actuating member is biased toward its second position.

18. The arrangement of claim 13 wherein said extension is a cylinder.

19. The arrangement of claim 13 wherein said extension is slidably received in said actuating member.

20. The arrangement of claim 19 wherein said extension is biased toward said collet nut.

21. The arrangement of claim 13 further including a lockout structure for locking said actuating member in said second position.

22. The arrangement of claim 21 wherein said actuating member includes a knob for rotation of said second gear and wherein said actuating member is disposed in an aperture formed in a housing of the power tool, and wherein said lockout structure includes a button disposed on a peripheral surface of said knob, said button connected to a flange member that abuts a portion of said housing adjacent said aperture when said actuating member is in its locked position and passes through said aperture when said button is depressed to allow movement of said actuating member to said first position.

23. The arrangement of claim 22 wherein said flange member is received in a recess formed in said actuating member when said button is depressed.

24. A router having a rotatably driven shaft onto which a bit is attached and rotated therewith through the use of a collet, the arrangement comprising:

a collet nut threadably engaging the shaft and movable along the shaft by rotation between the shaft and collet nut;

an actuating member rotatably received in an aperture of a housing of the router such that rotation of said actuating member results in relative rotation between the shaft and said collet nut, said actuating member being positionable between a first position and a second position, and wherein, in said first position, said actuating member allows relative rotation between said shaft and said collet nut, and in said second position, said actuating member allows free rotation of the shaft during operation of the power tool; and a knob attached to said actuating member for rotation thereof, said knob having a button disposed on a peripheral surface thereof, said button connected to a flange member that abuts a portion of said housing adjacent said aperture when said actuating member is in its second position to lock and passes through said aperture when said button is depressed to allow movement of said actuating member to said first position.

25. The arrangement of claim 24 wherein said flange member is received in a recess formed in said actuating member when said button is depressed.

26. The arrangement of claim 24 wherein said button is biased toward its locked position.

27. A bit attaching arrangement for a power tool, the power tool having a rotatably driven shaft onto which a bit is attached and rotated therewith through the use of a collet, the arrangement comprising:

a collet nut threadably engaging the shaft, said collet nut having a first gear so that rotation of said first gear causes rotation of the collet nut;

a plurality of slots disposed on said shaft; and an actuating member having a second gear associated therewith and also having a slot engaging extension associated therewith, said extension being slidably received in said actuating member;

wherein said actuating member is positionable between a first position and a second position; in said first position said second gear engages said first gear and said extension engages one of said slots such that rotating of said actuating member results in rotation of the collet nut while maintaining said shaft at a generally fixed rotational location; in said second position, said first and second gears do not engage one another and said extension does not engage any of said slots such that the shaft can be freely rotated during operation of the power tool.

* * * * *